United States Patent [19]

Dickerson et al.

[11] Patent Number: 4,617,423
[45] Date of Patent: Oct. 14, 1986

[54] DATA COMMUNICATION SYSTEM

[75] Inventors: James W. Dickerson, Plano; William N. Smith, III, Carrollton, both of Tex.

[73] Assignee: AGILE Systems, Carrollton, Tex.

[21] Appl. No.: 646,741

[22] Filed: Sep. 4, 1984

[51] Int. Cl.4 .......................................... H04L 15/00
[52] U.S. Cl. ................................................ 178/2 R
[58] Field of Search ............... 178/2 R, 2 C, 2 E, 74; 370/124

[56] References Cited

U.S. PATENT DOCUMENTS

2,616,080 10/1952 Homrighous ...................... 178/2 E

Primary Examiner—Stafford D. Schreyer
Attorney, Agent, or Firm—Hubbard, Thurman, Turner & Tucker

[57] ABSTRACT

A network multiple physical layer interface connected to a first communications network physical layer and through a MODEM to a second physical layer wherein the interface includes circuitry for selecting transmission and reception frequency bandwidths for the MODEM and also includes a first transceiver circuit for receiving data from the first physical layer and transmitting this data through the MODEM to the second physical layer and a second transceiver circuit for receiving data from the second physical layer through the MODEM and retransmitting the data on the first physical layer. The interface further includes user selectable modes to enable this interface to provide a communications connection to only the first physical layer or to both physical layers. Still further, the interface includes collision avoidance circuitry to prevent any transmissions onto the network through this interface when information traffic is present on either physical layer.

12 Claims, 10 Drawing Figures

DATA COMMUNICATION SYSTEM

BACKGROUND OF THE INVENTION

1. Field of the Invention

This invention relates generally to data communications and more particularly to data communications using multiple networks.

2. Description of the Prior Art

With the increase usage of digital computers, data communication between these digital computers has become very important. Commonly, this data communication is between a user terminal and a computer but in more sophisticated systems will occur between several terminals and several computers. In addition, peripherals such as printers and mass memory devices may be included. This data communications configuration is referred to as a network. Often times, data is transmitted through a communications network or channel by a transceiver sometimes referred to as a MODEM.

Several different types of physical layers or transmission media have been used previously to provide data communications between computer devices. One type, disclosed in U.S. Pat. No. 4,365,331 includes a single coax cable that is connected to several MODEMs where each MODEM provides a network interface to at least one device. Data is communicated over the coax cable by multiple frequency carrier transmissions taking advantage of the coax cable's broad bandwith capacitlity. Another type of physical layer includes several pairs of twisted wire.

It is an object of the present invention to provide a data communication network interface that permits communications between two electrically different physical layers in a manner that provides for simultaneous transmission of data information or information traffic on both physical layers. This capability allows terminals each connected to different physical layers to communicate as if the terminals were on the same physical layer.

When a multiple of devices are connected to a single communciations network, communications is established between devices by one device accessing the network when the network is inactive and calling the address of the device it wishes to communicate with. Often problems occur when two terminals attempt to access the network at the same time resulting in a data collision.

It is another object of the present invention to provide a system which will prevent a device from accessing the network when the network contains information traffic thus preventing or at least minimizing data collisions.

SUMMARY OF THE INVENTION

In accordance with the present invention a network multiple physical layer interface is provided that is connected to a communications network first physical layer and to a MODEM which is, in turn, connected to a second physical layer. This interface includes circuitry for selecting transmission and reception frequency bandwidths for the MODEM and a first transceiver circuit for receiving data from the first physical layer and transmitting the data through the MODEM to the second physical layer and further including a second transceiver circuit for receiving data from the second physical layer through the MODEM and transmitting this data on the first physical layer.

In a preferred embodiment the network multiple physical layer interface includes a circuit for transmitting and receiving data from one physical layer onto the other physical layer virtually simultaneously. Additionally, the interface includes a network collision avoidance circuit for prevention of transmission of data from a data terminal connected to the interface onto the network when information traffic is present on the network. A further feature includes circuitry within the interface to provide conversion of digitally formatted data received from the data terminal to NonReturn To Zero Inverted formatted data for transmission on the networks.

A still further feature includes a user selectable switch to designate one of several modes. In one mode, the interface provides a connected data terminal with communications only to the first physical layer. In a second mode, the interface provides the connected data terminal with a communications connection to both the first and second physical layers of the network together with providing retransmission of data received from one physical layer to the other physical layer. The third mode provides for the connected data terminal to only transmit to the first physical layer but additionally provides a head end function capacity for the retransmission of data received on the network.

In a still further embodiment, a data terminal network interface is disclosed that includes a MODEM connected to a first physical layer for transmitting and receiving information on that network. A terminal interface is proviced for communicating with a data terminal and for controlling transmission and reception of data over the first and the second network, and further includes a multiple physical layer communications circuit for receiving at least one control signal from the terminal interface and including at least one operational mode for transmitting and receiving data through the MODEM from the first physical layer and to the second physical layer simultaneously. In this embodiment, a network collision avoidance circuit is also provided for preventing transmission of data from the terminal interface when information traffic is present on the network. In one embodiment, the first physical layer includes at least one coaxial cable and the second physical layer includes several twisted wire pairs.

A second mode of operation is user selectable by a switch and includes a mode wherein the terminal interface is only permitting to transmit and receive data from the second physical layer. Additionally, a third user selectable mode is provided that permits only transmission and reception of data from the second physical layer and further providing a head end function for the network wherein the data received by the interface is retransmitted over the network. In one embodiment, this retransmission over the second network is accomplished by receiving data on one twisted wire pair and retransmitting the data on a separate twisted wire pair.

Further in this preferred embodiment, the network collision avoidance circuit includes a first circuit for detecting information traffic on the network and a second circuit provided to block the transmission by the terminal interface when such information traffic is present. The first circuit includes a logic gate that receives inputs from both the terminal interface and the bus receiver connected to the networks. The second circuit includes a latch connected to this logic gate and further connected to the terminal interface. The latch is further connected to a transmission means for transmitting data on the network. In operation the latch disables this transmission means when blocking data from the terminal interface.

BRIEF DESCRIPTION OF THE DRAWINGS

The novel features believed characteristic of the invention are set forth in the claims. The invention itself, however, as well as other features and advantages thereof will be best understood by reference to a detailed description of the preferred embodiment when read in conjunction with the accompanying drawings wherein:

DESCRIPTION OF THE PREFERRED EMBODIMENT

Figure 1:
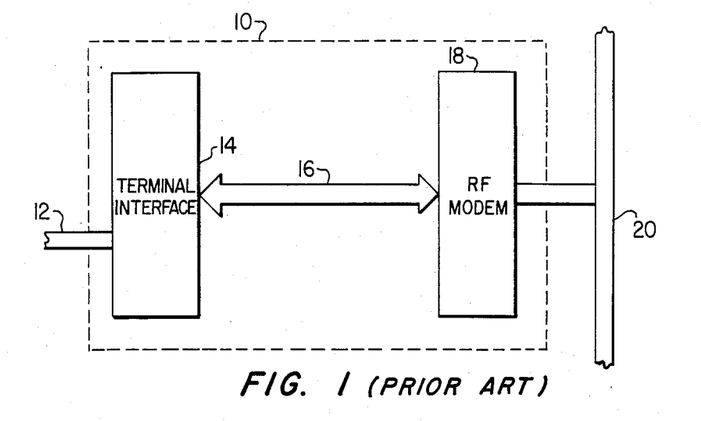
FIG. 1 is a block diagram illustrating the communications between a terminal and a coax bus as existing in the prior art.

With the recent advancement in computer technology, it has become advantageous to have computers communicate between themselves. One example of computer communication is through a network data communications architecture. An example of such an architecture is disclosed in U.S. Pat. No. 4,365,331 (herein incorporated by reference) which uses a coax cable connected to several MODEMs, in turn, connected to a terminal through an interface. Referring to FIG. 1, a block diagram of such a configuration is shown and is described in "LocalNet 20-Reference Manual And Installation Guide" by Sytek, Inc. herein incorporated by reference. The terminal is normally connected to this network interface 10 via a channel 12 which is commonly an RS-232 channel. The RS-232 channel is specified in the Electronics Industry Association Standard which is herein incorporated by reference. In FIG. 1, the RS-232 channel 12, is connected through the network interface 10 to a terminal interface board 14 which is Sytek Part No. 000889-01. The terminal interface board 14 contains a Central Processing Unit (CPU) device connected to a bus 16 for sending and receiving data from an RF MODEM 18 (available from Sytek as Model GE-80B-1774A, Part No. 000504-01) and for also controlling the MODEM 18. The MODEM is connected to a coax cable 20 used to send and receive data by radio frequency modulation to other terminals that are connected to similar network interfaces. The operation of such terminal interface 10 is fully disclosed and discussed in detail in U.S. Pat. No. 4,365,331.

Figure 2:
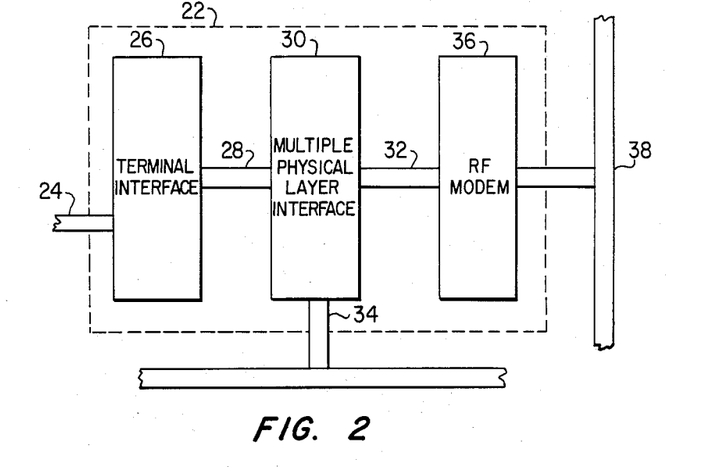
FIG. 2 is a block diagram of a network multiple physical layer interface illustrating a terminal communicating with both a coax bus and a twisted pair bus.

The present invention is illustrated in FIG. 2. FIG. 2 contains a network interface board connected to a terminal (not shown) via a data channel 24. The data channel 24 in the preferred embodiment is an RS-232 channel. Channel 24 is connected to a terminal interface 26 which operates in a similar manner to the terminal interface 14 of FIG. 1. The present invention does include certain additional features in the terminal interface 26 that are not contained in the terminal interface 14 of FIG. 1 as disclosed by U.S. Pat. No. 4,365,331, and which will be later discussed in greater detail. Terminal interface 26 is connected by channel 28 to a network multiple physical layer interface circuit 30. A physical layer is the physical and electrical characterisitics of a transmission medium implementation. The network multiple physical layer interface circuit 30 is likewise connected and controlling RF MODEM 36 and a coax cable physical layer bus 38 and, additionally, a second physical layer bus 34 which, in the preferred embodiment, is four twisted pairs of wires that conform to the RS-422 standard, herein incorporated by reference. The circuitry 30 provides the terminal with the capability to simultaneously transmit or receive information over the coax bus 38 physical layer and twisted pairs bus 34 physical layer. Additionally circuit 30 provides for the retransmission of information traffic on one physical layer when such information is transmitted by a terminal on the other physical layer.

Figure 3:
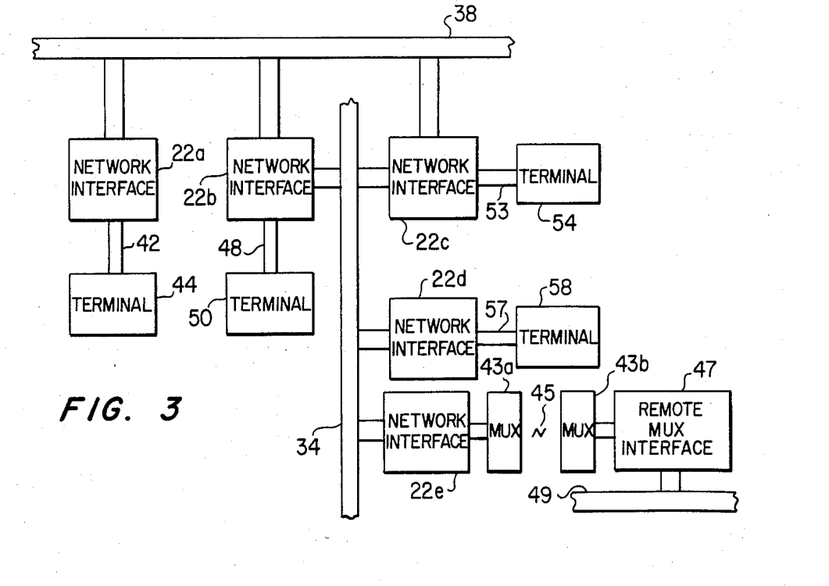
FIG. 3 is a block diagram illustrating several terminals connected to a coax bus and a twisted pair bus.

Such a network communications circuit provides for an increase capability in configuring communications architecture for terminals. FIG. 3 illustrates one such example using the network interface 22 of FIG. 2. In FIG. 3, terminal 44 is connected through an RS-232 channel 42 to a terminal interface 22a which can be either the terminal interface 22 of FIG. 2 or the network interface 10 of FIG. 1. Network interface 22a is connected to the coax bus 38. Also connected to the coax bus is network interface 22b which is also connected to a twisted pair bus 34. Network interface 22b is connected through an RS-232 channel 48 to terminal 50. In this configuration, terminal 50 when transmitting information through network interface 22b will transmit on both the coax bus 38 and the twisted pair bus 34 simultaneously. Likewise, when terminal 44 transmits information on to the coax bus 38 through network interface 22a, network interface 22b will receive that information for terminal 50 and additionally, will transmit that same information traffic over the twisted pair bus 34.

Also connected to twisted pair bus 34 is network interface 22d connected through an RS-232 channel 57 to a terminal 58. In this configuration terminal 58 will have the capability to transmit information through network interface 22d on to the twisted pair bus 34 and through network interface 22b to the coax bus 38 to interface to terminal 44 through network interface 22a. Also illustrated is an interface terminal 22c connected through an RS-232 channel 53 to terminal 54. Network interface 22c is connected to both the twisted pair bus 34 and the coax bus 38. In the configuration of FIG. 3, the network interface would only provide a connection to one or the other of the buses 34 or 38. In other words, the interface would be deactivated to one of the buses. In this configuration, network interface 22c would provide backup capability in case of a failure of network interface 22b. In the event of a failure of network interface 22b, network interface 22c could be switchably activated to interface to both the coax bus 38 and the twisted pairs bus 34 and provide the same function as previously provided by network interface 22b.

FIG. 3 further illustrates a network multiple physical layer 22e connected to the twisted pairs bus 34 and further connected via lines 41 to a general data communication GDC 1258 time division multiplexer (Part No. 036A009) 43a which provides media translation to several types of physical layers such as microwave, light wave, or other suitable media. The MUX 43a translates the twisted pairs bus 34 physical layer through the network multiple physical layer interface 22e to a microwave signal 45 in this example. A second MUX 43b rceives the microwave 45 and is interfaced to a remote MUX interface 47. The remote MUX interface 47 provides timing between the MUX 43b and a second twisted pair bus 49. In this configuration, the MUX 43a is virtually identical to the MODEM 36 of FIG. 2 with the exception of one signal to be discussed. MUX 43b is also virtually identical to MODEM 36 except for the timing of the remote MUX interface 47. Further, in this configuration of FIG. 3, the head-end function, to be discussed later, must be performed on bus 38 or bus 34. In other words, the twisted pair bus 49 and remote MUX interface 47 must be mere members of the network. Therefore, the network multiply physical layer interfaces 22a-f of FIG. 3, have provided connected interface connection to three separate physical layers coax, twisted pairs and microwave in one network. All of these different physical layers are totally transparent to the terminals, i.e the terminal operates as if only on physical layer exists.

Figure 4:
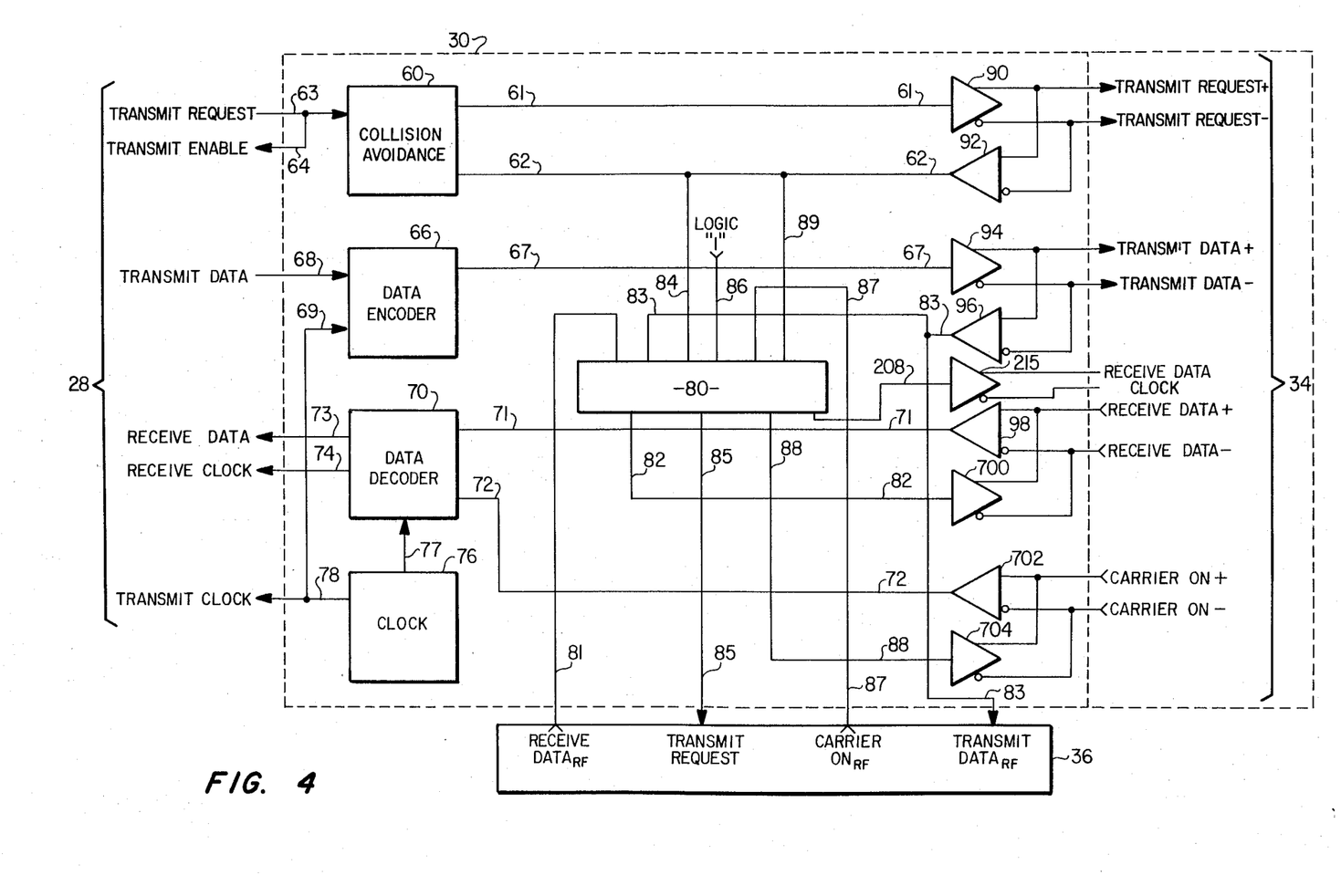
FIG. 4 is a block diagram illustrating the functional components of a network multiple physical layer interface circuit.

The network multiple physical layer interface circuitry 30 of FIG. 2 is illustrated as a functional block diagram in FIG. 4. The terminal interface 26 of FIG. 2 communicates with the network multiple physical layer interface circuitry through lines 28 that are illustratd in FIG. 4 as including the Transmit Request, Transmit Enable, Transmit Data, Received Data, Received Clock and Transmit Clock signals. Likewise, channel 32 connected to the RF MODEM 36 of FIG. 2 is illustrated in FIG. 4 as lines 81, 85, 87 and 83 connected to the RF MODEM 36 which are the Receive Data, Transmit Request, Carrier On and Transmit Data signals respectively. Lines 34 for the twisted pair bus are illustrated to include Transmit Request + and −, Transmit Data + and −, Receive Data + and −, and Carrier On + and −. The lines from bus 34 each are connected to a differential driver and differential receiver.

The network multiple physical layer interface circuitry also includes a user selectable mode switch 80 which provides for one of three modes of operation. In one mode, the circuitry provides communication only to the twisted pair bus 34 and isolates the terminal from the coax bus and MODEM 36. In another mode, the circuitry is interfaced both to the twisted pair bus 34 and the coax bus through MODEM 36 and provides a pass through capability such that data received from bus 34 is retransmitted on MODEM 36 and data received from MODEM 36 is retransmitted on bus 34 together with the respective control signals. In this mode the terminal connected via channel 28 is permitted dual and simultaneous access to both buses enabling that terminal to communicate both with a coaxial bus through MODEM 36 and a twisted pair bus 34. In addition, with the pass through capability all terminals connected to bus 34 are provided with the capacity to communicate with all terminals connected to the coax bus through MODEM 36. Likewise, all terminals on the coax bus may communicate with all terminals on the twisted pair bus 34.

In a still further mode of operation, the multiple network communications circuitry is again isolated from MODEM 36 while being connected to the twisted pair bus 34. In this mode, the multiple network communications circuitry provides a head end function. In accordance with the protocol for both the twisted pair bus and the coax bus, one network interface (or some other device) connection on the bus must provide a head end function requiring that data and control received by that head end terminal be retransmitted by that network interface over a receive data frequency or a receive data twisted pair. When using the coax bus, another terminal will be required to provide the head end function. However, if only the twisted pair bus is used, the circuitry will provide the head end function in this mode by retransmitting the data received on the transmit data lines on the receive data lines.

Functional blocks 60, 66, 70 and 76 provide the signal interface to the terminal. When the terminal desires to transmit data over either bus, a Transmit Request signal is raised on line 63 into the collision avoidance circuitry of block 60. The multiple network communications circuitry immediately returns a Transmit Enable signal on line 24 since line 63 is tied to line 64. However, the Transmit Request signal is then processed through the collision avoidance circuitry 60 to determine if the actual transmission will be allowed on the buses. If the collisioin avoidance circuitry 60 allows a transmission, a signal is raised on line 61, which is transmitted via driver 90 over the Transmit Request + and − lines. Additionally, any Transmit Request signals on these lines are received by receiver 22 and sent to the collision avoidance circuitry 60 via line 62.

If information traffic is present on the bus, the Transmit Request signal is not raised on line 61 and data is not transmitted even though the terminal operates as if it is transmitting data. Since the terminal will not receive the head end retransmission, it will automatically retransmit the data in accordance with bus protocol. By this operation, the collision avoidance circuitry 60 prevents data collisions upon the buses with a minimum of circuitry and interface with the terminal.

If the transmission is permitted by the collision avoidance circuitry 60, the terminal sends the data to be transmitted over line 28 connected to the Data Encoder circuitry 66. The transmitted data from line 68 is also combined with the clock signal on line 69 to produce the data to be transmitted over the bus 34 and MODEM 36. The Clock data from the Clock circuitry 76 is used by the Data Encoder circuitry 66 to produce a NonReturn To Zero Inverted formatted data signal on line 67 which is connected to the Transmit Data driver 94. Data received on the transmit data lines are received by receiver 96 and are transmitted to driver 700 via line 83 through selector 80 and line 82 in the head end mode. Receiver 96 and line 83 are also connected to the RF MODEM 36 for transmission of the data over the coax bus. Data received from bus 34 is connected via receiver 98 to line 71 for decoding by the Data Decoder circuitry 70. The Data Decoder circuitry 70 includes an input, line 77, from the Clock circuitry 76 to decode the NonReturned To Zero Inverted formatted data to binary formatted data on the received data line 73 together with the Received Clock line 74 for the terminal. The Data Decoder circuitry 70 includes an input from line 72 from the Carrier On signal lines to indicate the data is present. Clock circuitry 76 further provides the Transmit Clock signal on line 78 to the terminal.

Switch 80 is provided to enable the user to switch between the three operational modes previously discussed. In the first mode, the terminal is provided access to the twisted pair bus 34 only, lines 82 and 85 are not connected and line 88 is only connected to line 89. In the second mode, the terminal is provided connection to both bus 34 and a coax bus through MODEM 36, and line 83 is connected to line 81, line 85 is connected to line 84 and line 88 is connected to line 87. In the third mode, the terminal is only connected to the twisted pairs bus 34 but the network multiple physical layer interface circuitry is providing the head end function, and line 82 is connected to line 83, line 85 is connected to the logic "1" and line 88 is only connected to line 89. Line 208 provides input to driver 215 for the receive data clock signal. It should be noted that this signal is only used to interface to the MUX 43a of FIG. 3.

Figure 5:
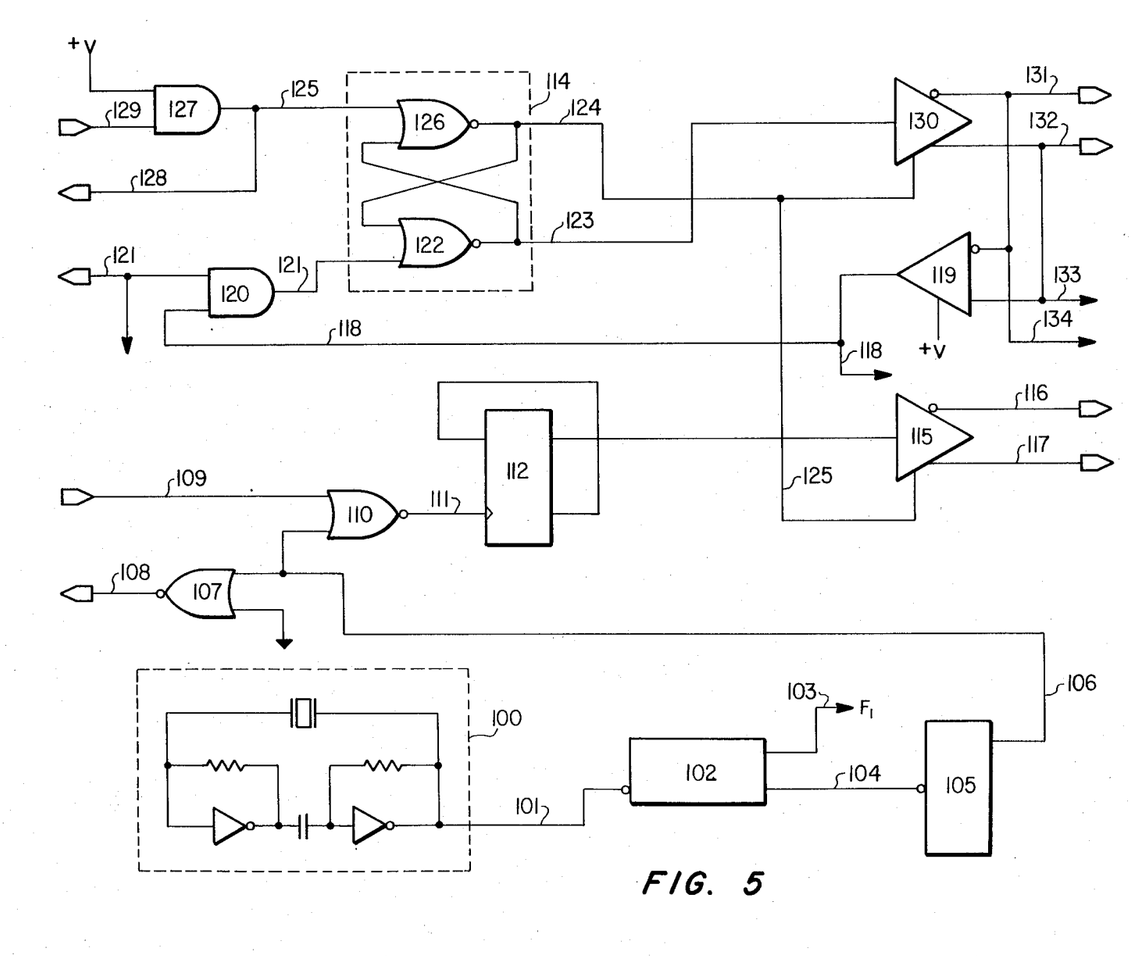
FIG. 5 is a schematic diagram of the collision avoidance circuitry and clock circuitry.

FIG. 5 illustrates the circuitry of the collision avoidance circuit 60 and the clock circuit 76 in FIG. 4. In FIG. 5, AND gate 127 receives the Transmit Request signal from the terminal via line 129 and transmits this signal via line 125 to a latch circuit 114 including NOR gates 126 and 122. Additionally, the Transmit Request signal is returned as a Transmit Enable signal on line 128. The latch 114 is also connected by line 121 through AND gate 120 and line 121 to the Carrier signal of the terminal. Both the Transmit Request and Carrier signals are active low (all signals that are active low will be designated by a "-" after the signal name). AND gate 120 is further connected by line 118 to receiver 119 which is tied to lines 131 and 132 to receive the Transmit Request- signals from the twisted pairs bus 34. The output of NOR gate 126 on line 124 is connected to the enable of the signal transmitter 130. The output of NOR gate 122 on line 123 is connected to the input of transmitter 130 and transmits the Transmit Request- signal on to lines 131 and 132 when the transmitter 130 is enabled.

In operation, the latch 114 acts to store the state of the bus (i.e. busy or available) and AND gate 120 acts to force a transition of the latch when either the Carrier-signal is present on line 121 of a Transmit Request- is received from the twisted pair bus through reciever 119 and present on line 118 to AND gate 120. If the bus is not busy, then latch 114 will permit a Transmit Request-signal on line 129 if the MODEM does not provide a Carrier- signal on line 121. The latch 114 will transition such that transmitter 130 is enabled and transmits the Transmit Request- over lines 131-132. However, if a Transmit Request- is already present on lines 131 and 132, the Transmit Request- signal will be received by receiver 119 on line 118 and transmittd through AND gate 120 to cause latch 114 to transition disabling the transmitter 130. If a carrier is present on the coax bus, the MODEM will provide a Carrier- signal on line 121 to transition latch 114. Therefore, in this state when the Transmit Request- is received from the terminal and Carrier- is received from the MODEM, the Transmit Request- will not be transmitted over the bus via the transmitter 130.

Data to be transmitted from the terminal is placed onto line 109 from the terminal which is NORed in NOR gate 110 with the Clock from line 106. Additionally, NOR gate 107 acts as a buffer to transmit the Transmit Clock signal on line 108 back to the terinal. The combined data and clock on line 111 is then transmitted through a D flip-flop 112 onto line 113 to form the NonReturn To Zero Inverted formatted data signal to be transmitted to the twisted pair bus via transmitter 115 over lines 116 and 117. Note that line 124 from latch 114 enables transmitter 115 to transmit the data. Therefore, if the collision avoidance latch 114 is preventing a Transmit Request- from being trasmitted by line 129 over the Transmit Request- twisted pair 131 and 132, likewise this latch will prevent data from being transmitted via transmitter 115.

The Clock circuitry in FIG. 5 includes an oscillator circuit 100 which is connected by line 101 to a counter 102 producing one clock signal F1 on line 103, and a second clock signal on 104. The clock signal 104 is input to a second counter 105 which includes an output on line 106. In the preferred embodiment, counters 102 and 105 are divide down counters which provide lower frequency clock signals from the higher frequency oscillator signal.

Figures 6, 7:
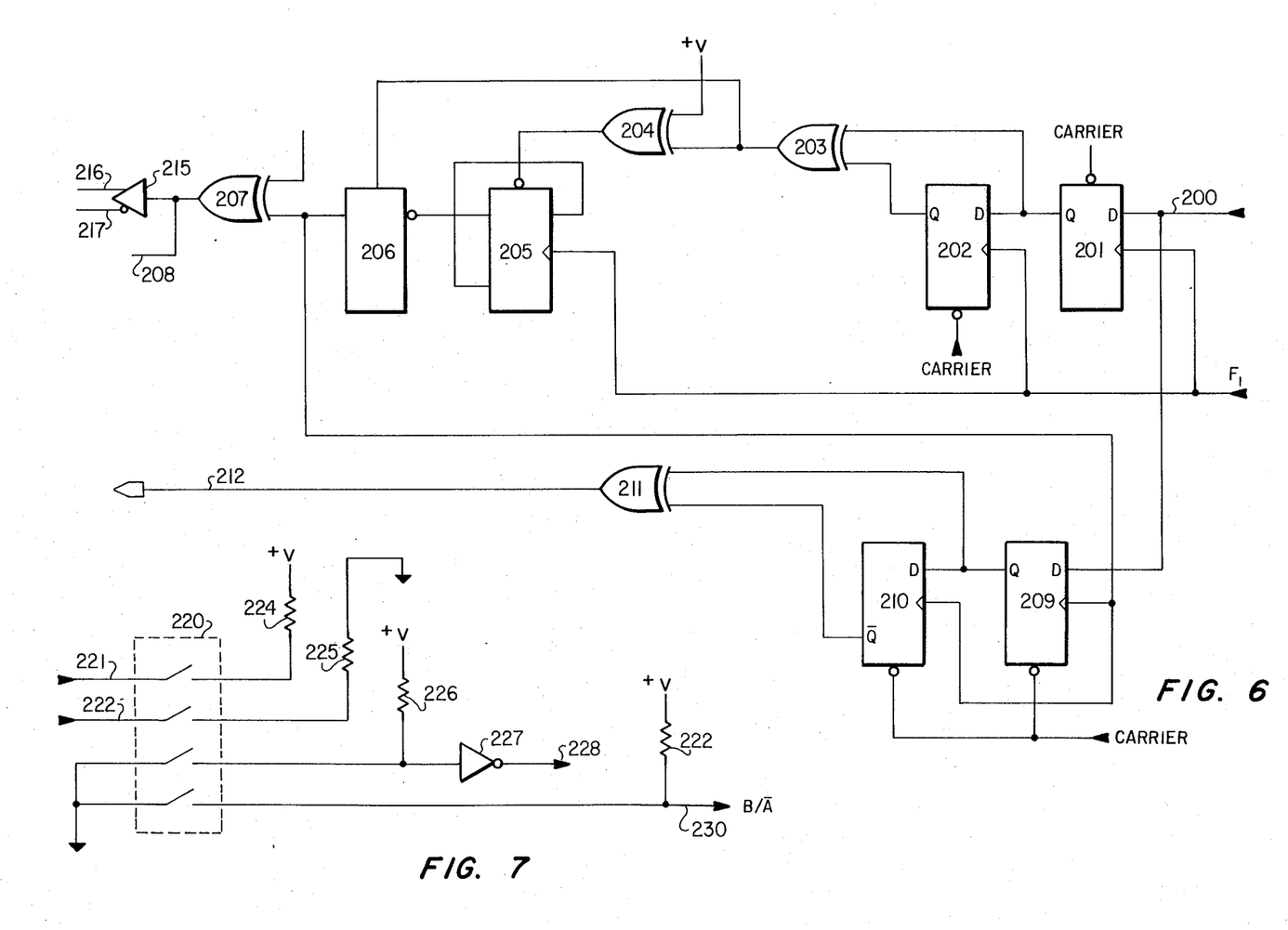
FIG. 6 is a schematic diagram of the data decoder circuitry.
FIG. 7 is a schematic diagram of the user selector switch.

FIG. 6 illustrates the Data Decoder circuitry of FIG. 4. The Received Data from a bus receiver (to be discussed in FIG. 8) is received on line 200 in a NonReturn To Zero inverted format. F1 from FIG. 5 is input into D flip-flops 201, 202, and 205 along with the Received Data on line 200. The outputs of D flip-flops 201 and 202 are connected to the inputs of EXCLUSIVE OR gate 203 and buffered through EXCLUSIVE OR gate 204 into a D flip-flop 205. The output of D flip-flop 205 is connected through counter 206 and through a buffer (EXCLUSIVE OR gate 207) to produce the Receive Clock on line 208. This receive clock signal is also input to driver 215 to produce a differential receive data clock signal on lines 216 and 217. The Received Data in the NonReturn To Zero Inverted format is also input into a NOR gate 209 together with the output of counter 206. The output of D flip-flop 209 is input into D flip-flop 210 which is also clocked by the output of counter 206. This combination with the further EXCLUSIVE OR gate 211 produces a binary formatted data signal on line 212 for transmission to the terminal interface. Note that D flip-flops 201, 202, 209 and 210 are cleared in the absence of the Carrier signal.

FIG. 7 illustrates the user selectable switches which determine the mode of the multiple network communications circuit. This selector function includes a multiple switch 220 with four switch functions. Lines 221 and 222 are connected to the + and − of the Transmit Request signal and provide biasing for the signal. Line 228 is an enable used to enable the circuitry to provide the head end function and is an output of inverter 227 connected to a pullup resistor 226. Line 230 includes the pullup resistor 229 and provides a signal to a multiplexer for providing the interface to both the coax bus and the twisted pair bus.

Figure 8:
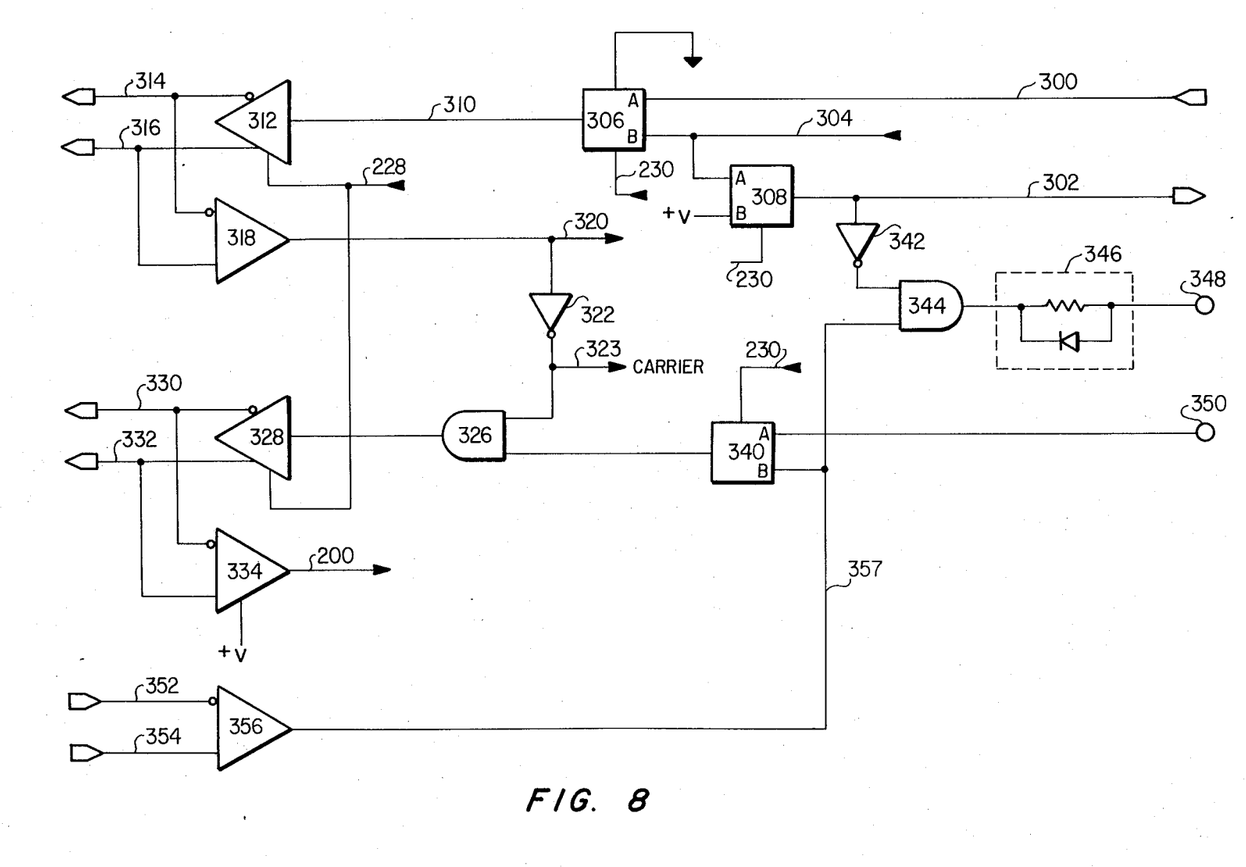
FIG. 8 is a schematic diagram of the mode selection circuitry.

FIG. 8 illustrates the circuitry used with the mode selection signals from the circuitry in FIG. 7. The ENABLE signal 228 from the selector circuitry to FIG. 7 is used to enable two twisted pair transmitters 312 and 328 to provide the head end function and the coax bus to twisted pair bus pass through function. Likewise switch signal 230 from FIG. 7 is used to set the switch position of multiplexers 306, 308 and 340 to provide the coax bus to twisted pair bus pass through capability and head end function capability. The Carrier- signal from the MODEM is connected on line 300. Line 304 is the Transmit Request- signal from FIG. 5 on line 118. If multiplexer 306 is set for A then the Carrier- from the MODEM is passed through to the twisted pair transmitter 312 to tranmit the Carrier- on to lines 314 and 316. If multiplexer 306 is set to B then the Transmit Request- signal from FIG. 5 is used to generate a Carrier- signal on lines 314 and 316. The Carrier- signal is received by receiver 318 and is transmitted as Carrier- on line 320 and Carrier- on line 323. The Carrier- signal, line 323, is used to enable AND gate 326 to provide the RF MODEM with a means to send data from the coax bus via line 350 through transmitter 328 on to the twisted pair bus lines 330 and 332 when position A is selected on multiplexer 340. The data on the twisted pair lines 330 and 332 are also recieved by receiver 334 and transmitted via line 200 to the circuitry in FIG. 6. The transmitted data from the twisted pair lines 352 and 352 is received via by receiver 356 and retransmitted, in the head end function mode, via line 357 to the receive twisted pair 330 and 332 through transmitter 328 and AND gate 326 when multiplexer 340 is in the B position. When the multiplexer 340 is in the A position the Trasmit Data signal on line 357 is transmitted through AND gate 344 and buffer circuitry 346 to the RF MODEM at node 348. AND gate 344 is enabled for this transmission via inverter 342 when the Transmit Request-line 302 is active.

Figure 9:
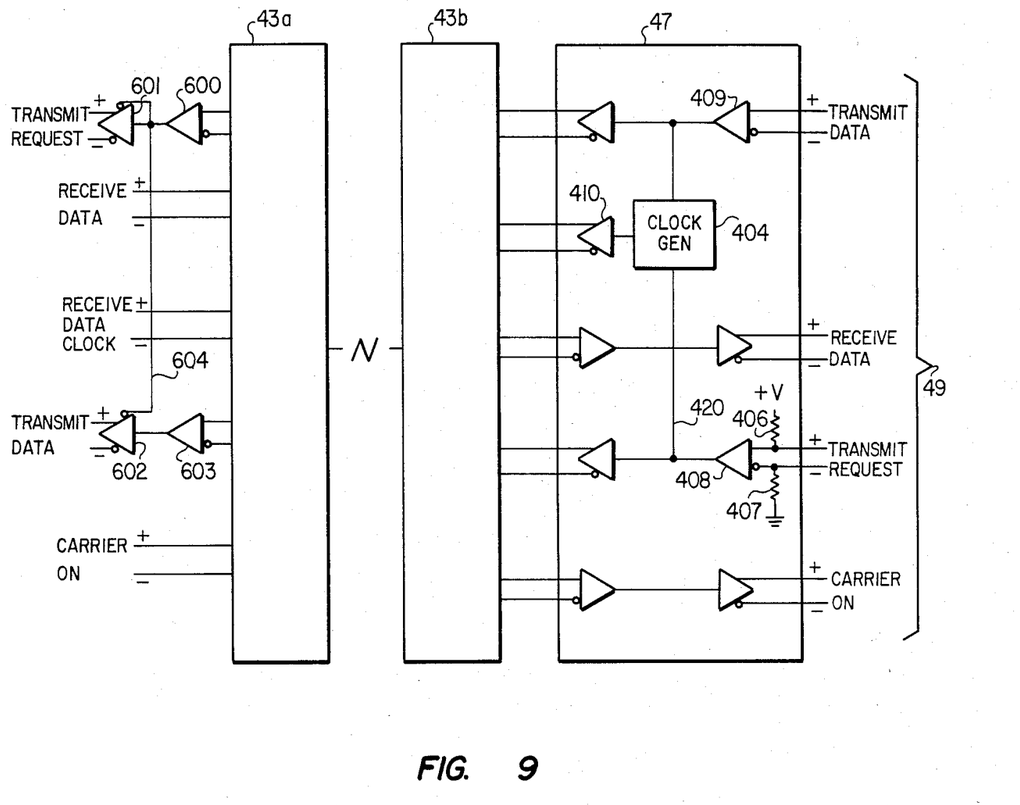
FIG. 9 is a network block diagram including two multiple physical layer interfaces connected through a microwave link.

FIG. 9 is a block diagram illustrating the interface between a second physical layer type and a third physical layer type as previously discussed in FIG. 3. In FIG. 9 a General Data Communications MUX 43a is connected to the twisted pair bus 34 through the network interface 22c. Specifically, the signals to the MUX 43a are the Transmit Data, Receive Data, Receive Data Clock, Transmit Request and Carrier on signals previously discussed. The Transmit Request signal is coupled through a receiver 600 and driver 601 and the Transmit Data signal is coupled through a receiver 603 and driver 602. Both outputs of drivers 601 and 602 are connected to the twisted pair bus 34. The drivers 601 and 602 are only enabled when the Transmit Request signal is originated by MUX 43a. The MUX 33a transmits and receives data over a third physical layer, in this perffered embodiment, a microwave link, to MUX 43b. MUX 43b is interfaced to a remote MUX interface 47 illustrated as including a clock generator circuit 404. MUX 43a and MUX 43b act as signal conversion circuits. The outputs of the remote MUX interface 47 is identical to the twisted pair lines for bus 34. It should be noted that the output for the Transmit Request- lines are biased by resistors 406 and 407 to provide a known input state. The clock generator circuit 404 is connected to drivers 408 and the output of the Transmit Request- driver 409 to produce the interfacing clock signal for the MUX 43b.

Figure 10:
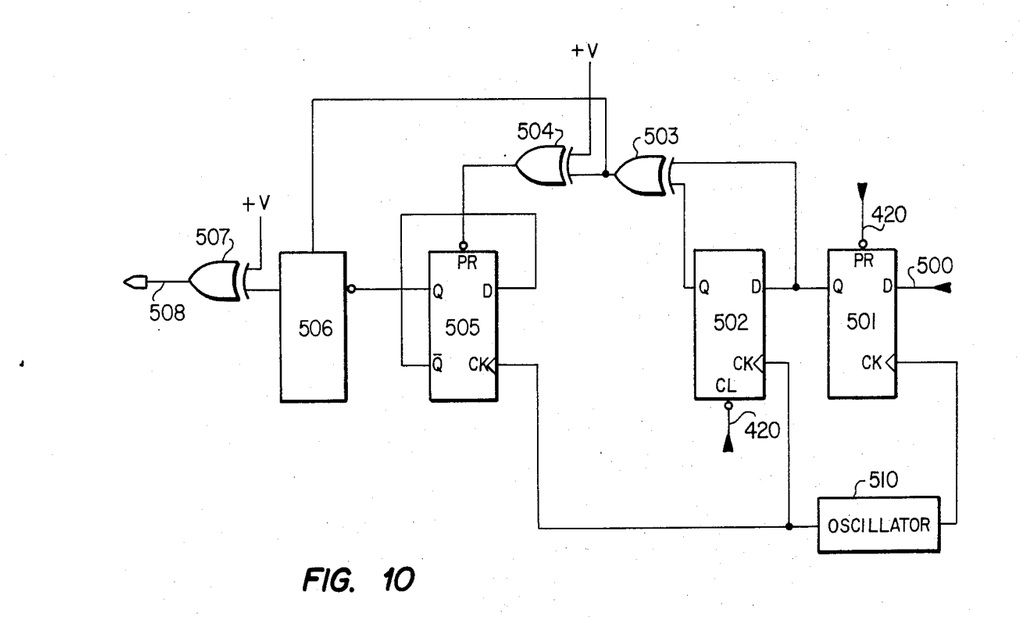
FIG. 10 is a schematic of the clock generator circuit for the network remote side of FIG. 9.

FIG. 10 is a schematic diagram of the clock circuit for the remote MUX interface 47. This circuit is very similar to the circuitry of FIG. 6 and operates identically with the exception that the preset input 420 to flip-flop 501 and the clear input 420 to flip-flop 502 originate from the Transmit Request- receiver 409 of FIG. 9 as shown and timing for flip-flops 501 and 505 is provided by oscillator 510.

Although a preferred embodiment has been described in detail, it should be understood that various substitutions, alterations, and modifications may become apparent to those skilled in the art. These changes may be made without departing from the spirit and scope of the invention as defined by the appended claims.

What is claimed is:

1. A network multiple physical layer interface connected to a communcations network of a first physical layer type and a second physical layer type, each layer type including a send channel and a receive channel, said interface comprising:
   a first circuit means for receiving data from said first physical layer send channel and receive channel and simultaneously transmitting said data to said second physical layer send channel and received channel respectively;
   a second circuit means for receiving data from said second physical layer send channel and receive channel and simultaneously transmitting said data on said first physical layer send channel and receive channel respectively;
   a third circuit means for receiving data from one of the send channels and transmitting the data to one of the receive channels;
   means for transmitting and receiving data from, said first physical layer send channel and receive channel and simultaneously transmitting and receiving data through a MODEM to said second physical layer send channel and receive channel; and
   a data terminal and a network collision avoidance means operatively connected to the data terminal for preventing transmission of data from said data terminal when information traffic is present on the first and second physical layers.

2. A network multiple physical layer interface according to claim 1 further including conversion means to convert digitally formatted data signals from said data terminal to a NonReturn To Zero Inverted formatted data signal for transmission to said first and second physical layers.

3. A network multiple physical layer interface according to claim 2 further including user selectable switching means for designating a first mode where said interface enables said data terminal to only communicate with said first physical layer, or a second mode wherein said interface enables said data terminal to communicate with only said first physical layer and performs a retransmission of data received, or a third mode providing for data transfer between said first physical layer to said second physical layer while enabling communication with said data terminal.

4. A data terminal network multiple physical layer interface comprising:
   at least one MODEM connected to a first physical layer send channel and receive channel for transmitting and receiving data from said first physical layer send channel and receive channel;
   terminal interface means for communicating with a data terminal and for controlling transmission and reception of the data over said first physical layer send channel and receive channel and a second physical layer send channel and receive channel;
   a network interface means for receiving at least one control signal from said terminal interface means and having an operational mode for transmitting and receiving said data through said MODEM to said first physical layer send channel and receive channel and to said second physical layer send channel and receive channel simultaneously; and
   a network collision avoidance means for preventing transmission of said data from said data terminal when information traffic is present on the first and second physical layers.

5. A data terminal network multiple physical layer interface according to claim 4 wherein said first physical layer includes at least one coaxial cable.

6. A data terminal network multiple physical layer interface according to claim 5 wherein said second physical layer includes a plurality of twisted wire pairs.

7. A data terminal network multiple physical layer interface according to claim 4 wherein said network collision avoidance means includes a first circuit means for detecting information traffic on the network and a second circuit means connected to said first circuit means for blocking transmission onto the network by the terminal when the information traffic is present.

8. A data terminal network multiple physical layer interface according to claim 7 wherein said first circuit includes a logic gate receiving inputs from both the terminal and a bus receiver connected to the network.

9. A data terminal network multiple physical layer interface according to claim 8 wherein said second circuit means includes a latch connected to said logic gate and further connected to the terminal.

10. A data terminal network multiple physical layer interface according to claim 9 wherein the latch is further connected to transmission means for transmitting said data on said first and second physical layers, said latch disabling said transmission means when blocking the data terminal transmission.

11. A communication data network comprising a terminal interface board including:
a terminal interface having a computing means for sending and receiving data and a data channel terminal for sending and receiving the data of the terminal interface;
a network multiple physical layer interface circuit responsive selectively to the data received and to be transmitted to the terminal interface for selective multiplexing and demultiplexing;
an RF MODEM selectively responsive to the data from and for the network multiple physical layer interface circuit for selectively modulating and demodulating the data;
a first type physical layer bus operatively connected to the RF MODEM and a second type physical layer bus having a send channel and a receive channel; and
a mode selection switch means responsive to user selection for only transmitting and receiving data from said second physical layer, send channel and receive channel, respectively, and for connecting the second physical layer and first physical layer for providing a pass through capability whereby data received from the second physical layer are retransmitted by the MODEM and data received on the MODEM are retransmitted on the second physical layer and the terminal interface has dual access to the second physical layer and the MODEM.

12. A data terminal network including a plurality network multiple physical layer interfaces to provide a communications channel between a plurality of data terminals, said network comprising:
a first terminal connected to a first network multiple physical layer interface including means for communicating data to said first terminal, means for selecting transmission and reception frequency bandwidths for a first MODEM, a first circuit means for receiving the data from a first physical layer send channel of the network and transmitting said data through said first MODEM to a second physical layer send channel of the network and a second circuit means for receiving data from the second physical layer receive channel through said first MODEM and transmitting said data on said first physical layer receive channel simultaneously with said first circuit means;
a second terminal connected to a second network multiple physical layer interface including means for communicating data to said second terminal, and a means for transmitting and receiving data through a first signal conversion circuit to a third physical layer send channel and receive channel respectively and which is connected to a second signal conversion circuit connected to a third network multiple physical layer interface, a first circuit means for receiving data from said first physical layer send channel and transmitting said data through said first and second signal conversion circuits to said second terminal and a second circuit means for receiving data from said first and second signal conversion circuits and transmitting said data on said first physical layer receive channel;
a third terminal connected to a fourth network multiple physical layer interface including means for communicating data to said third terminal and including a circuit for receiving and transmitting data to said first physical layer receive channel and send channel respectively; and
a network collision avoidance means for preventing transmission of data when information traffic is present on any physical layer.

* * * * *